| ICING HUMIDITY SWITCH POSITION | CAT | RPM RELAY POSITION | CARB. ICE TIMING MOTOR OPERATION |
|---|---|---|---|
| DRY | ANY | EITHER | DE-ICE |
| WET | <-10°C | EITHER | NO CHANGE |
| WET | -10°C TO +10°C | <400 | NO CHANGE |
| WET | -10°C TO +10°C | >400 | ICE |
| WET | >+10°C | EITHER | DE-ICE |

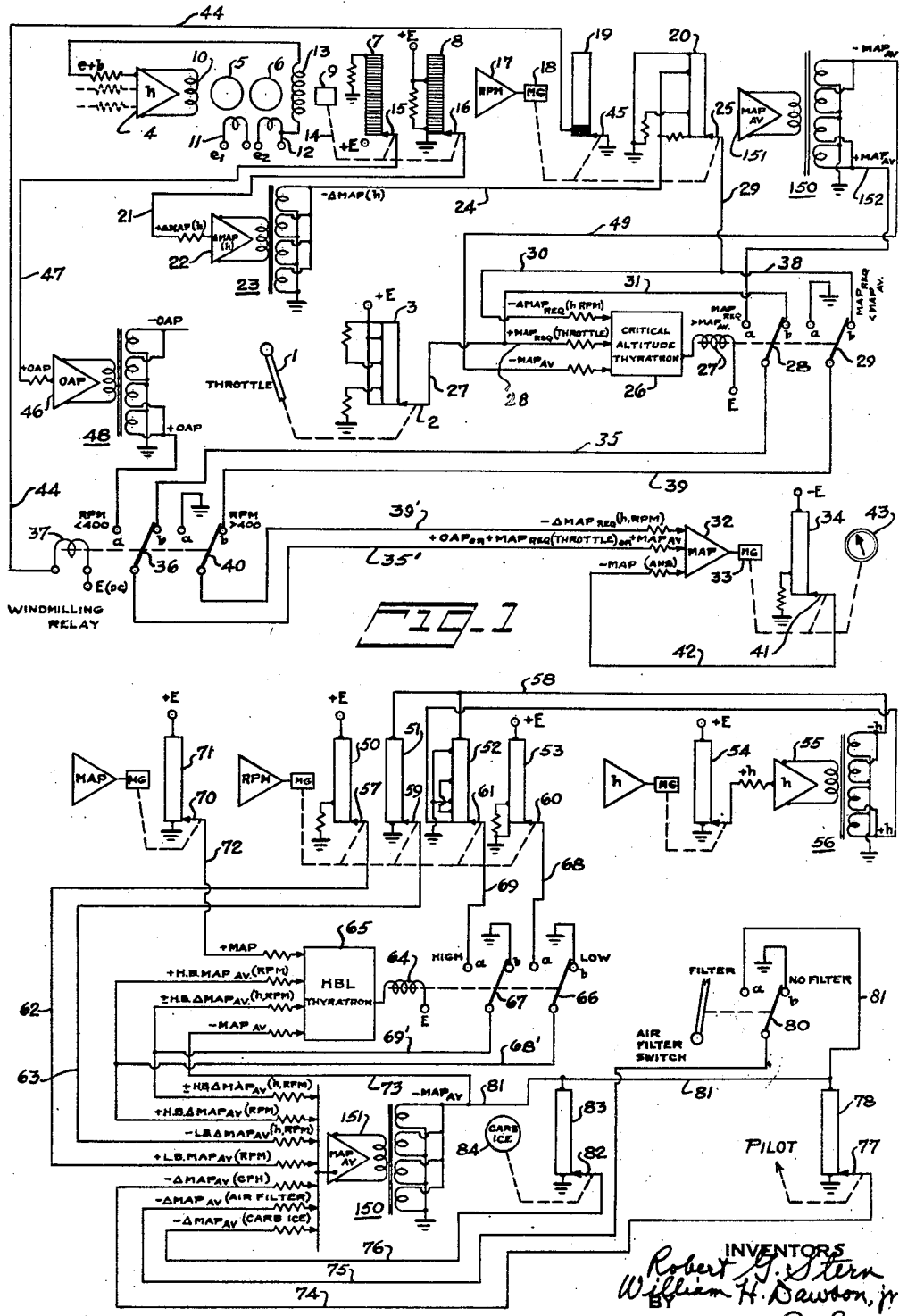

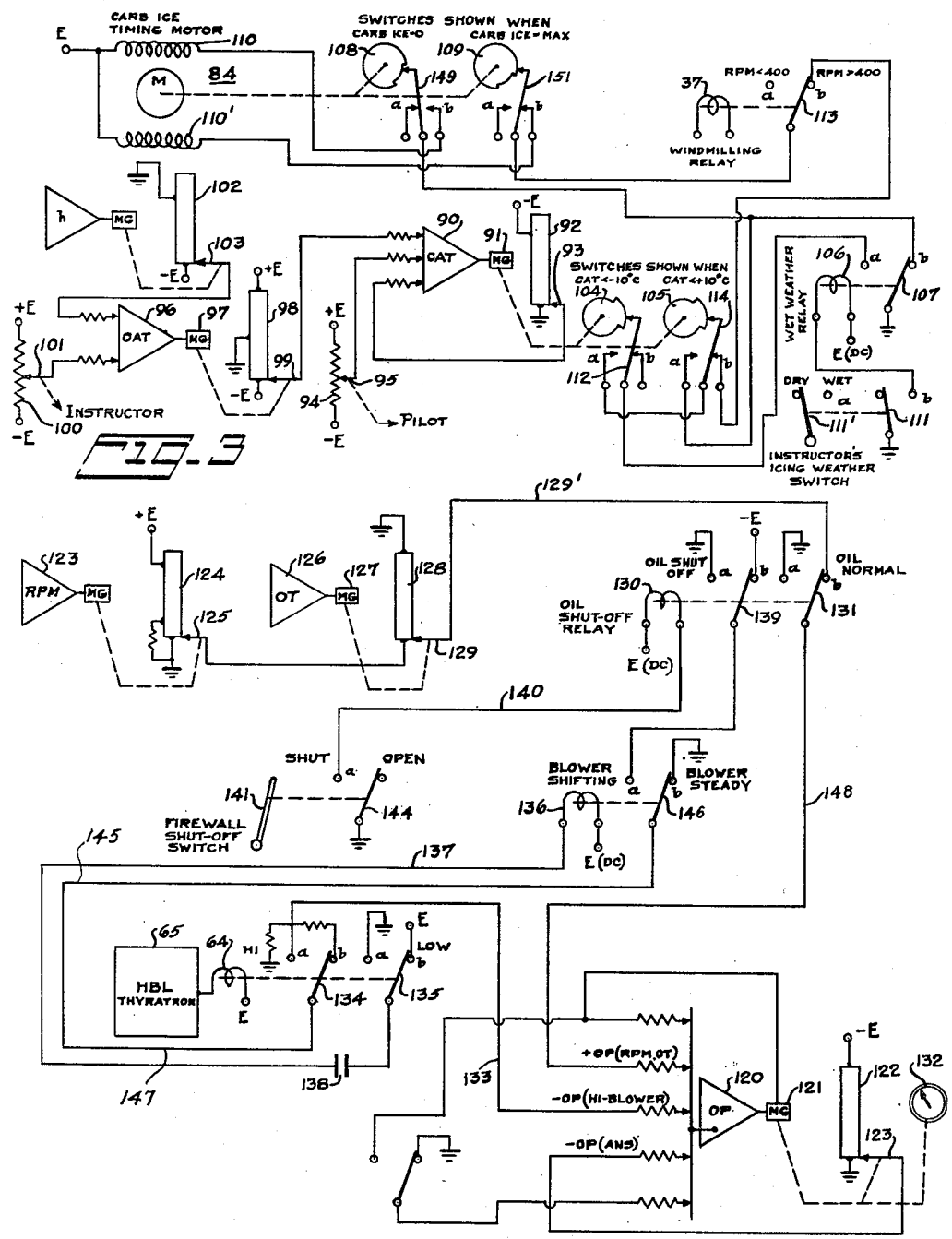

FIG. 5

United States Patent Office 2,808,658
Patented Oct. 8, 1957

2,808,658

SIMULATED MANIFOLD PRESSURE SYSTEM
FOR AIRCRAFT

Robert G. Stern, West Caldwell, and William H. Dawson, Jr., Waldwick, N. J., assignors to Curtiss-Wright Corporation, a corporation of Delaware Application June 14, 1954, Serial No. 436,478

11 Claims. (Cl. 35—12)

This invention relates to aircraft trainers and more particularly to apparatus for simulating an aircraft engine manifold pressure system of the type employing an automatically operated two-stage blower and wherein manifold pressure is in the main under the control of the pilot's throttle lever.

Certain types of aircraft such as those having the Air Force designations C-119 and C-124 are provided with an automatic power unit wherein the pilot's throttle lever functions as a manifold pressure control. Manifold pressure is supplied by a two-stage blower which is capable of operating in high or low blower for delivering more or less pressure respectively. The manifold pressure which is actually available at any particular time for meeting the pilot's demand is dependent upon whether the blower is operating in low or high blower, upon the altitude of the aircraft and engine R. P. M., and upon such other factors as the extent of carburetor preheating, air filter operation, and icing conditions within the carburetor. Low blower operation prevails as long as sufficient manifold pressure is available to meet that demanded, however, when the demand cannot be met in low blower the blower is automatically shifted into high blower operation to maintain throttle lever control of the manifold pressure. Throttle lever control of the manifold pressure becomes ineffective only if the manifold pressure available with the blower in high blower operation is insufficient to meet that demanded. A shift from low blower to high blower operation is reflectced in engine oil pressure, a momentary drop in oil pressure occurring. This drop is reflected on an oil pressure indicator and is the main cue which the flight crew has that the blower is shifting.

Aircraft trainers of various types are well-known in the art. No trainer has been developed however for an aircraft of the type contemplated having a manifold pressure system such as described including an automatically operated two-stage blower wherein manifold pressure is under control of the throttle lever. It would be desirable to provide a trainer for such an aircraft for familiarizing prospective crews with the controls and instruments of the various systems therein in particular the manifold pressure system.

It is accordingly a prime object of this invention to provide means for effectively simulating a manifold pressure system of the described type.

It is another object of this invention to simulate the drop in oil pressure occurring upon shifting from low to high blower operation in the said manifold pressure system.

It is still another object of my invention to simulate icing and deicing in the carburetor and the effect thereof upon the operation of the manifold pressure system.

Figs. 1 and 2 are diagrammatic illustrations which taken together show the main components of the manifold pressure system and their inter-relation.

Fig. 3 is a diagrammatic illustration of the carburetor ice simulating system.

Fig. 4 is a diagrammatic illustration of means for simulating oil pressure dip due to a shift from low to high blower operation.

Fig. 5 is a schedule of the operation of the carburetor ice simulating system.

In Fig. 1 of the drawings reference character 1 designates a simulated throttle lever which is connected to the slider contact 2 of a potentiometer 3. The design of potentiometer 3 is such that a voltage is derived at slider contact 2 representing manifold air pressure requested as a function of throttle position as the throttle lever 1 is moved. This voltage is designated in the drawing as $-MAP_{req}$ (throttle). Although manifold pressure requested is mainly a function of throttle position as determined by movement of the throttle lever, the factors of altitude and engine R. P. M. should be taken into consideration for a more accurate determination of manifold air pressure requested at any particular time. An altitude servo system $(h)$ and an R. P. M. servo system (RPM) function in computing the effect of altitude and engine R. P. M. on manifold pressure requested.

The altitude servo is typical of a number of other servo systems shown in the drawings. Other servo systems include the manifold air pressure servo (MAP), the manifold air pressure available servo ($MAP_{av}$), the outside air pressure servo (OAP), the outside air temperature servo (OAT), the carburetor air temperature servo (CAT), the oil temperature servo (OT) and the oil pressure servo (OP). Referring to the altitude servo system as an example, the system includes a servo amplifier 4 to which are applied a number of control voltages representing respectively quantities determining altitude as described in the co-pending application of Robert G. Stern, one of the applicants in the present application, for "Aircraft Training Apparatus for Simulated Landing and Related Maneuvers," S. N. 134,623, filed December 23, 1949, now Patent No. 2,731,737, granted January 24, 1956, and includes also a motor 5 responsive to the amplifier output, a feed back generator 6 driven by the motor 5 and a number of potentiometers, as for example 7 and 8 having their slider contacts connected through a gear reduction box 9 to the motor generator set. The servo amplifier 4 is a summing amplifier for determining the resultant for the respective input voltages representing the quantities which determine altitude. Such amplifiers are well-known in the art for algebraically summing a plurality of separate A. C. voltages of varying magnitude and polarity and a detailed circuit illustration therefore is unnecessary.

As indicated, the output of the amplifier is used to control a servo network including a motor-generator set diagrammatically indicated on other parts of the drawing as M. G. The operation of the motor-generator set is essentially the same in each of the various servos of the manifold pressure system and a single illustration for the altitude servo is therefore sufficient. The motor 5 is of the 2-phase type, the control phase 10 of which is energized by the amplifier output as illustrated and the other phase 11 by a constant reference A. C. voltage $e_1$, dephased 90° from the control voltage. The operation of this type of motor is well-known, the rotation being in one direction when the control and reference voltages of the respective phases have the same instantaneous polarity, and in the opposite direction when the instantaneous polarity of the control voltage is reversed with respect to the reference voltage, the rate of rotation in both cases depending on the magnitude of the control voltage. A generator 6 which is driven by motor 5 is a 2-phase generator having one phase 12 energized by a 90° dephased A. C. reference voltage $e_2$, the other phase 13 generating according to the motor speed a feed-back voltage $efb$ for purposes of velocity control. The motor 5 also serves to gang-operate through gear reduction box 9 and suitable mechanical connections indicated by dotted line 14 the contacts of a potentiometer system as for example contacts 15 and 16 of potentiometers 7 and 8, and may also in certain servo systems operate an appropriate indicating instrument.

The individual potentiometer resistance elements such as units 7 and 8 of the altitude servo system may be of the well-known wound card type and are of circular or band form in practice but are diagrammatically illustrated in plane development for clarity. A structural arrangement that may be conveniently used for a servo motor and potentiometer combination of the character above referred to is shown in Patent Number 2,431,749, issued December 2, 1947, to R. B. Brant for Potentiometer Housing and Positioning Structure.

It will be apparent that operation of the servo motor in either direction causes the gang-operated potentiometer slider contacts, such as the slider contact 15 and 16 to move to corresponding angular positions on the respective potentiometer elements for deriving, i. e. picking off potentiometer voltages depending on the respective contact position. Each potentiometer of each servo system is shaped or contoured and designed with suitable shunting resistances as required so that the value of the derived voltage at the potentiometer contact bears a certain relationship to the linear movement of the slider contact depending upon the particular function of the potentiometer, and has an A. C. voltage impressed across its terminals depending as to instantaneous polarity and magnitude also on the function of the potentiometer.

As stated hereinbefore, the altitude servo system and the R. P. M. servo system serve to compute the effect of altitude and engine R. P. M. on the manifold pressure requested. The R. P. M. servo system includes the amplifier 17, motor-generator set 18 and a number of potentiometers including potentiometers 19 and 20. Potentiometer 8 of the altitude servo is designed to provide a voltage at slider contact 16 representing the effect of altitude upon manifold pressure requested. Slider contact 16 is connected by line 21 to a line amplifier 22 for amplifying this derived voltage. A transformer 23 is provided to effect a phase shift of 180°. The transformer secondary is connected by line 24 to the R. P. M. potentiometer 20 which is so designed that a negative voltage designated $-\Delta MAP_{req}$ ($h$, RPM) is derived at its slider contact 25 representing the effect of both altitude and R. P. M. on manifold pressure requested.

As shown slider contact 2 is connected to a thyratron 26 over lines 27 and 28 and slider contact 25 is connected to the thyratron over lines 29 and 30. The thyratron is labeled as the critical altitude thyratron for reasons which will hereinafter become apparent. Thyratron 26 as shown is connected with a relay 27' which includes contacts 28 and 29. The relay picks up whenever the thyratron is operative. The thyratron which is shown diagrammatically for simplicity may be connected in circuit in a conventional manner, i. e. by connecting input lines 28 and 30, and the input line 49 through their respective summing resistors to the control grid of the tube. The relay 27' may be connected in the plate circuit which is supplied with the A. C. voltage E.

Slider contacts 2 and 25 in addition to being connected to the critical altitude thyratron are also connected to a manifold pressure servo system including servo amplifier 32, motor-generator 33 and potentiometer 34. Slider contact 2 is connected over line 27, line 31, back contact 28$b$ of relay 27, line 35, back contact 36$b$ of a windmilling relay 37 and line 35' to amplifier 32, providing relays 27 and 37 are de-energized. Slider contact 25 is connected over line 29, line 38, back contact 29$b$ of relay 27, line 39, back contact 40$b$ of relay 37 and line 39' to amplifier 32 provided the relays 27 and 37 are de-energized. As shown potentiometer 34 has a slider contact 41 connected by a line 42 to the amplifier 32 to provide an answer signal therefor. An instrument 43 for indicating manifold pressure at any particular time is operated by the manifold air pressure servo. The windmilling relay 37 is connected by a line 44 to one end portion of the potentiometer 19 of the R. P. M. servo. This end portion is the only conducting portion of the card. The card therefore serves as a switch providing for the energization of relay 37 only when the slider contact 45 of card 19 assumes a position along such portion. Such a position for the slider contact corresponds to an engine R. P. M. less than a specified number of revolutions per minute as e. g. 400 R. P. M. below which the engine cannot operate. When the engine R. P. M. drops to 400 revolutions per minute or thereabouts the throttle control lever is no longer effective in determining the manifold pressure. Manifold pressure is then determined by the outside air pressure. Simulating means are provided for deriving a voltage representing outside air pressure and such means include amplifier 46 to which slider contact 15 of potentiometer 7 in the altitude servo is connected over line 47, and transformer 48.

In addition to the voltages derived at slider contacts 2 and 25, $+MAP_{req}$ and $-\Delta MAP_{req}$ ($h$, RPM) respectively which are input voltages to the thyratron 26, there is also a negative voltage $-MAP_{av}$ representing in magnitude the manifold pressure available which is fed to the thyratron over an output line 49 of a transformer 150. This voltage is determined as the resultant of a number of factors summarized in amplifier 151. As shown the other output line 152 of transformer 150 is connected to front contact 28$a$ of relay 27.

Apparatus is provided (see Fig. 2) for computing the available manifold pressure in either of two stages of simulated blower operation that is, in low blower and high blower. Available manifold pressure is computed as a function of engine R. P. M. and altitude less a reduction in manifold pressure due to preheating of the carburetor air, air filter operation and ice formation in the carburetor. Means for deriving voltages representing the available manifold pressure as a function of altitude and R. P. M. include R. P. M. servo cards 50, 51, 52 and 53, and the altitude servo card 54 in conjunction with line amplifier 55 and transformer 56. The potentiometer card 50 is adapted to provide a positive voltage at slider contact 57 representing available manifold pressure in low blower as a function of R. P. M. Such voltage is designated $+LBMAP_{av}$ (RPM). Potentiometer card 51 as shown is energized at one end over line 58 by a negative voltage from transformer 56 representing the altitude of flight in accordance with the operation of the altitude servo. The effect of altitude is in this manner introduced into the derivation of low blower manifold pressure available. The other end of the potentiometer card 51 is grounded and the card is contoured so that a voltage is derived at its slider contact 59 as a function of altitude and R. P. M. representing an increment which when added to the voltage $+LBMAP_{av}$ (RPM) provides a voltage quantity representing the manifold pressure available in low blower as a function of the altitude and R. P. M. The voltage increment is designated in the drawing as $-LB\Delta MAP_{av}$ ($h$, RPM). This voltage is 180° out of phase with the voltage derived at slider contact 57 of card 50 and is for this reason designated as a negative quantity. A voltage $+HBMAP$ (RPM) representing as a function of R. P. M. only an increase in manifold pressure available due to high blower operation is derived at the slider contact 60 of R. P. M. potentiometer card 53, and a voltage $\pm HB\Delta MAP_{av}$ ($h$, RPM) representing an increment which when added to the quantities $+LBMAP_{av}$ (RPM), $-LB\Delta MAP_{av}$ ($h$, RPM) and $+HBMAP$ (RPM) produces a sum representing the manifold pressure available in high blower as a function of altitude and R. P. M. is derived at slider contact 61 of card 52. Card 52 is energized in a similar manner to card 51, that is over line 58 for introducing the effect of altitude into the derivation of the available manifold pressure.

Slider contact 57 is connected over line 62 to manifold air pressure available servo amplifier 151 and slider contact 59 is connected to servo amplifier 151 over line 63 so that the voltages $-LBMAP_{av}$ (RPM) and $-LB\Delta MAP_{av}$ (h, RPM) become input voltages to the manifold air pressure available servo amplifier. Slider contacts 60 and 61 connect with the manifold pressure amplifier 151 only when a relay 64 which is controlled in accordance with the operation of a high blower thyratron 65 picks up contacts 66 and 67, slider contact 60 being then connected over a line 68, front contact 66a and line 68′ with the amplifier 151 and slider contact 61 being connected with the amplifier 151 over line 69, front contact 67a of the relay 64 and line 69′. Slider contacts 60 and 61 also connect over lines 68, 68′ and 69, 69′ respectively with the high blower thyratron 65 when relay 64 is energized. The voltages $\pm HB\Delta MAP_{av}$ (h, RPM), and $+HBMAP_{av}$ (RPM) thus become inputs to servo amplifier 151 and thyratron 65 whenever relay 64 closes its front contacts 66a and 67a. High blower thyratron 65 has other input voltages $+MAP$ and $-MAP_{av}$ respectively representing in magnitude actual manifold pressure and available manifold pressure. The voltage $+MAP$ is derived at slider contact 70 of a manifold pressure servo card 71 and fed to the thyratron over line 72. The $-MAP_{av}$ voltage is fed to the thyratron 65 over line 73 which connects with a negative output side of the transformer 150. Additional inputs to the manifold pressure servo amplifier 151 are the negative voltages $-\Delta MAP_{av}$ (CPH), $-\Delta MAP_{av}$ (air filter), and $-\Delta MAP_{av}$ (carb. ice) which respectively represent reductions in the available manifold pressure in either high or low blower operation due to operation of carburetor preheating means, operation of the air filter, and ice conditions in the carburetor. These voltages are fed to amplifier 151 over lines 74, 75 and 76. The voltage $-\Delta MAP_{av}$ (CPH) representing a reduction in the available manifold pressure due to the operation of carburetor preheating means is derived at slider contact 77 of potentiometer 78 according to the position of the contact as determined by a student pilot. Operation of the air filter is reflected by closing front contact 80a of the air filter switch which completes a circuit energized by the $-MAP_{av}$ voltage extending over line 81, line 81′, contact 80a, line 75 and an input resistor of suitable magnitude to amplifier 151. The voltage $-MAP_{av}$ (carburetor ice) is derived at slider contact 82 of potentiometer 83, which is energized by the voltage $-MAP_{av}$ over line 81, slider contact 82 being operated by an ice timing motor 84. Potentiometers 78 and 83 are both connected at one end as shown to line 81. The potentiometers are thus energized by the voltage $-MAP_{av}$.

Operation of the apparatus shown in Figs. 1 and 2 which simulates the manifold pressure system in its broader aspects is initiated by movement of the simulated throttle 1. Voltage $+MAP_{req}$ (throttle) is derived at slider contact 2 of the potentiometer 3 according to movement of throttle 1 and fed to the manifold air pressure servo amplifier 32 over line 27, line 31, contact 28b, line 35, contact 36b, and line 35′ provided relays 27 and 37 are de-energized. The voltage $-\Delta MAP_{req}$ (h, RPM) derived at slider contact 25 of potentiometer 20 is also fed to the manifold pressure servo amplifier 32 over lines 29, line 38, contact 29b, line 39, contact 40b, and line 39′ provided the relays 27 and 37 are de-energized. As previously stated, voltage $+MAP_{req}$ (throttle) represents manifold pressure as a function of the throttle position and the voltage $-\Delta MAP_{req}$ (h, RPM) represents the effects of altitude R. P. M. The voltage $-\Delta MAP_{req}$ (h, RPM) is relatively small as compared to the voltage $+MAP_{req}$ (throttle) and the operation of the MAP servo is therefore in the main a function only of the throttle position assuming there is sufficient manifold pressure available to meet that requested in accordance with the position of the throttle lever.

The voltage $+MAP_{req}$ (throttle) and $-\Delta MAP_{req}$ (h, RPM) are also fed to the critical altitude thyratron 26 along with the voltage $-MAP_{av}$ representing the available manifold pressure in either high or low blower operation as the case may be. The critical altitude thyratron 26 is biased to fire when the summation of the voltages $-\Delta MAP_{req}$ (h, RPM) and $+MAP_{req}$ (throttle) is equal to or greater than the available manifold pressure voltage $-MAP_{av}$. When the critical altitude thyratron 26 is fired relay 27 picks up opening contacts 28b and 29b, and closing contacts 28a and 29a thereby removing the voltages $+MAP_{req}$ (throttle) and $-\Delta MAP_{req}$ (h, RPM) as inputs to the MAP servo amplifier 32 and substituting therefor the manifold air pressure available voltage $+MAP_{av}$. This is accomplished by connecting $+MAP_{av}$ voltage appearing in output line 152 of transformer 150 over front contact 28a to the MAP servo amplifier and by connecting line 39 through front contact 29a to ground. Accordingly, the MAP servo and the indicator 43 is operated at such time in accordance with the available manifold pressure rather than according to the position of the throttle control lever 1. As previously pointed out, windmilling relay 37 picks up whenever the engine R. P. M. becomes so low that the engine can no longer function. When this occurs, contacts 36b and 40b open and contacts 36a and 40a close to connect a voltage output $+OAP$ of transformer 150 representing ambient air pressure to the MAP servo amplifier 32 after first disconnecting other input voltages thereto. The MAP servo and indicator 43 is therefore operated in such event according to the outside air pressure.

The amount of available manifold pressure represented by the term $MAP_{av}$ which is fed to the critical altitude thyratron 26 as a negative voltage over line 49 is dependent upon whether high or low blower operation prevails. In low blower operation the high blower thyratron 65 is unfired (Fig. 2), the relay 64 is de-energized and its back contact 66b and 67b are closed. With back contacts 66b and 67b closed, line 68′ and 69′ are connected to ground and the only inputs to the $MAP_{av}$ available servo amplifier are the voltage quantities $+LB\ MAP_{av}$ (RPM), $-LB\ MAP_{av}$ (h, RPM), $-\Delta MAP_{av}$ (CPH), $-\Delta MAP_{av}$ (air filter), and $-MAP_{av}$ (carb. ice) which are fed to the amplifier over lines 62, 63, 74, 75 and 76 respectively. These quantities are summed in the $MAP_{av}$ servo amplifier and provide output voltages for the transformer 150 representing the available manifold pressure in low blower operation. In high blower operation, the high blower thyratron is fired and relay 64 is picked up: Back contacts 66b and 67b are opened and front contacts 66a and 67a are closed. Accordingly, both the voltage $+HB\ MAP_{av}$ (RPM) and $\pm HB\ MAP_{av}$ (h, RPM) are connected to the MAP servo amplifier 151. The voltage $HB\ MAP_{av}$ (RPM) is connected to the MAP servo amplifier 151 over line 68, front contact 66a and line 68′, and the voltage $\pm HB\ MAP_{av}$ (h, RPM) is connected to amplifier 151 over line 69, front contact 67a and line 69′. These voltages are additional to those fed to the MAP servo amplifier in low blower operation and provide an output for the transformer 150 representing in magnitude the available manifold pressure in high blower operation. Input voltages $+MAP$ and $-MAP_{av}$ are fed to the high blower thyratron 65 regardless of whether the system is operating in high or low blower. These two quantities represent the only inputs to the high blower thyratron in low blower operation. There are, however, two other input voltages to the high blower thyratron, namely $+HB\ MAP_{av}$ (RPM) and $\pm HB\ MAP_{av}$ (h, RPM) when the system is operating in high blower and relay 64 is picked up. At such time, voltage $\pm HB\ \Delta MAP_{av}$ (h, RPM) is connected to the high blower thyratron over line 69, front contact 67a of relay 64 and line 69′, whereas the voltage $+HB\ MAP_{av}$ (RPM) is connected to the high blower thyratron over line 68, front contact 66a and line 68′.

The high blower thyratron is biased to fire whenever the manifold air pressure represented by the voltage quantity +MAP attains a value which is slightly less than the magnitude of the available manifold pressure input voltage −MAP$_{av}$. If while operating in low blower the manifold air pressure voltage +MAP attains such a value the high blower thyratron fires to add the voltages +HB MAP$_{av}$ (RPM) and ±HB ΔMAP$_{av}$ (h, RPM) as input to the servo amplifier 151 and thereby effect an increase in the output voltage of transformer 150 so that such output voltage represents the manifold pressure available in high blower. The voltage input −MAP$_{av}$ to the high blower thyratron accordingly increases. The input voltages +HB MAP$_{av}$ (RPM), ±HB MAP$_{av}$ (h, RPM) and −MAP$_{av}$ sum up to the available manifold pressure in low blower and the high blower thyratron therefore remains operative. Since the high blower thyratron fires to effect an increase in the available manifold pressure whenever the actual manifold pressure +MAP, as determined by the voltage quantities +MAP$_{req}$ (throttle), −ΔMAP$_{req}$ (h, RPM) attains a value slightly less than the manifold pressure available, the critical altitude thyratron having +MAP$_{req}$ (throttle), −ΔMAP$_{req}$ (h, RPM), and −MAP$_{av}$ as voltage inputs is normally unfired in low blower operation. Normally, the MAP servo is therefore operated except for the minor effects of altitude and R. P. M. in accordance with the position of throttle lever 1 through low blower operation and in high blower operation until the manifold pressure available in high blower operation is no longer available to meet that requested due to increased altitude of flight at which time the critical altitude thyratron fires and the MAP servo is operated according to the available manifold pressure. The critical altitude thyratron may be fired only transiently when the similator is operated in low blower.

The potentiometer 83 for deriving the voltage −ΔMAP (carb. ice) has its slider contact 82 controlled by the carburetor ice timing motor 84 which in turn is controlled by apparatus shown in Fig. 3 for simulating the formation of ice in the carburetor of the aircraft. The formation of ice in the carburetor is dependent upon carburetor air temperature, humidity and whether or not air is flowing through the carburetor. Carburetor air temperature in turn is dependent upon the outside air temperature, the altitude of flight, and adjustment of carburetor heating means. A carbureor air temperature servo is provided for simulating air temperature conditions in the carburetor. The carburetor air temperature servo is controlled by a simulated pilot carburetor heat control and an outside air temperature servo, and the outside air temperature servo is in turn controlled in accordance with the operation of the altitude servo and an instructor's ambient temperature control. The carburetor air temperature servo includes servo amplifier 90, motor generator set 91 and potentiometer 92 with its slider contact 93 which is connected to the amplifier 90. As stated the carburetor air temperature servo is controlled by the outside air temperature servo and the simulated pilot carburetor heat control. The pilot carburetor heat control consists of the potentiometer 94 and slider contact 95 which is connected to the amplifier 90, the position of the slider contact 95 and therefore the input voltage to amplifier 90 being determined by means of a lever (not shown) which may be positioned by a pilot undergoing training in the simulator. The outside air temperature servo includes the amplifier 96 motor generator set 97 and potentiometer card 98 with its slider contact 99 which is positioned by the motor generator set 97 for deriving a voltage representing outside air temperature and which is connected to the amplifier 90 such that said voltage also becomes an input to the carburetor air temperature servo.

An instructor's ambient temperature potentiometer 100 having a slider contact 101 is provided for deriving one voltage input for the outside air temperature servo amplifier 96. The derived voltage at slider contact 101 represents outside air temperature at sea level and is dependent upon movement of the slider contact along the potentiometer 100. Suitable means may be provided whereby the slider contact 101 can be positioned by an instructor. The altitude servo is provided with a potentiometer 102 and slider contact 103 for deriving another input voltage to the outside air temperature servo 96, such voltage representing the effect of altitude in determining the outside air temperature. This voltage is derived at the slider contact 103 which is connected to the amplifier 96.

The carburetor air temperature servo controls the operation of a pair of cam operated switches 104 and 105 according to simulated temperature conditions in the carburetor. These switches 104 and 105 in conjunction with a wet-weather relay 106 including front and back contacts 107a and 107b, windmilling relay 37, and cam operated limit switches 108 and 109 control the energization of circuitry which includes windings 110 and 110' of the ice motor in such a manner that the motor is operated to simulate ice conditions within the carburetor of the plane. Switch 104 includes contacts 112a and 112b, and switch 105 includes contacts 114a and 114b. The switches are operated in accordance with the operation of the carburetor air temperature servo in such a manner that front contact 112a is closed only when simulated carburetor air temperature is greater than −10° centigrade, and contact 114a is closed only when the carburetor air temperature is greater than +10° centigrade. Switch 108 includes contacts 149a and 149b and switch 109 includes contacts 151a and 151b. The switches 108 and 109 are operated by the timing motor such that contact 150b is open whenever the motor armature occupies one of two possible limiting positions and contact 151b is open only when the motor armature occupies the other limiting position. The one limiting position in which contact 150b is open corresponds to a position for slider contact 82 (Fig. 2) at the end of potentiometer 83 connected with ground such that zero voltage is derived at contact 82 indicating the absence of ice from the carburetor. The other limiting position in which contact 149b is open corresponds to a position for the slider contact at the end of potentiometer 83 connected to transformer 150 such that a maximum voltage is derived at contact 82 indicating maximum ice formation within the carburetor. As shown relay 106 is controlled over a circuit connected at one end to a positive direct voltage E (D. C.) and connected at its other end to ground provided a contact 111b interposed in the circuit is closed. Contact 111b may be opened and closed by the operation of an icing wet weather switch 111' under control of an instructor. When the wet weather switch 111' is in a dry position contact 111b is open, the relay 106 is de-energized, contact 107b is open and contact 107a is closed. However when the wet weather switch 111' is in a wet position contact 111b is closed, the relay 106 is energized, contact 107a is open and contact 107b is closed. The apparatus of Fig. 3 closely simulates the formation of ice of the plane as a function of carburetor air temperature, R. P. M., and atmospheric humidity. A schedule indicating icing conditions in the carburetor as a function of these factors is shown in Fig. 5 of the drawings.

Referring to Figs. 3 and 5, when the instructor's icing humidity switch 111' is in a dry position the wet weather relay 106 is de-energized and contact 107b is closed so that a circuit is completed through the coil 110 of the ice motor contact 149b of switch 108 (assuming there is ice in the carburetor) and contact 107b. By reason of the energization of coil 110 the ice motor is caused to operate in a direction such that slider contact 82 (Fig. 2) is moved toward ground to reflect melting of the ice in the carburetor. Such operation of the motor with the icing humidity switch in a dry position is independent of both carburetor air temperature and of R. P. M.

When the icing humidity switch 111' is in a wet position a number of things may occur depending upon the simulated carburetor air temperature and engine R. P. M. The various possibilities are set forth in the last four columns of the schedule in Fig. 5. If the simulated carburetor air temperature is less than —10° C., the motor will remain inoperative indicating no change in ice conditions regardless of engine R. P. M. since neither of the motor windings will be energized. A circuit cannot be completed through winding 110 since contact 107b is open and a circuit cannot be completed through winding 110' since switch 104 has its contact 112a open. The icing motor also remains inoperative with the ice humidity switch in the wet position if the carburetor air temperature is within the range of —10° C. to +10° C. and the R. P. M. of the engine is less than 400 since an energizing circuit cannot be completed over winding 110 with relay contact 107b open and an energizing circuit cannot be completed over winding 110' with contact 113b of relay 37 open. If, however, the R. P. M. is greater than 400 the windmilling relay is de-energized and its contact 113b is closed thereby completing an energizing circuit through winding 110', contact 151b (assuming less than a maximum amount of ice in the carburetor), contact 113b, 114b of switch 105, contact 112a of switch 104, and contact 107a of relay 106 to operate the motor, and slider contact 82 of potentiometer 83 in a direction indicating the formation of ice in the carburetor. If the carburetor air temperature is greater than +10° contact 114a of switch 105 is closed and an energizing circuit is completed regardless of engine R. P. M. through winding 110, contact 149b (provided ice exists in the carburetor), contact 114a of switch 105, contact 112a of switch 104, and contact 107a of relay 106. The motor is thereby caused to operate slider contact 82 toward the grounded end of potentiometer 83 indicating a melting of ice in the carburetor.

Operation of the motor in one direction or the other indicating either the formation or melting of ice in the carburetor is interrupted by means of limit switches 108 and 109 hereinabove referred to which open the energizing circuits for the motor windings over contacts 149b and 151b when the motor is operated to a position respectively indicating the complete melting of ice in the carburetor and the formation of a maximum amount of ice. Operation of the motor may be interrupted at any other time upon a change in conditions occurring as for example a change in carburetor air temperature, in which event the slider contact 82 will assume an intermediate on potentiometer card 83 indicating in terms of the derived voltage at slider contact 82 a specific quantity of ice in the carburetor. The timing motor is selected so that the motor operates at rate such that the rate of formation and melting of ice as indicated by movement of potentiometer 83 corresponds to the rate of formation and melting of ice in the actual aircraft.

When there is a switch-over from high blower to low blower operation in the aircraft the crew is made aware of what is occurring by a dip which occurs in the oil pressure indicator of the plane. This effect is simulated by means of the apparatus shown in Fig. 4. Such apparatus includes the oil pressure servo (OP) having as input voltages +OP (RPM, OT) representing oil pressure as a function of R. P. M. and oil temperature, an answer signal —OP (ANS.), and a voltage signal —OP (HI. BLOWER) for reflecting a switch from low to high blower operation which signal exists only momentarily after the high blower thyratron fires. The oil pressure servo includes servo amplifier 120 motor generator set 121 and potentiometer 122 having a slider contact 123 which connects with the servo amplifier 120 for providing the answer signal. As stated, the oil pressure servo amplifier has an input voltage quantity —OP (RPM, OT) representing oil pressure as a function of R. P. M. and oil temperature. Such input voltage is derived in accordance with the operation of the R. P. M. servo and an oil temperature servo OT controlled as shown in the copending application of Stern and Port, the former of whom is one of the applicants in the present application, for "Simulated Oil Cooling System for Aircraft Engine," S. N. 436,531, filed June 14, 1954 (of even date). The R. P. M. servo includes a potentiometer card 124 and slider contact 125, and the oil temperature servo includes servo amplifier 126, motor generator set 127, potentiometer card 128 and slider contact 129. A voltage is derived at slider contact 125 in the R. P. M. servo and fed to one end of the potentiometer card 128 of the oil temperature servo such that voltage +OP (RPM, OT) derived at slider contact 129 of the oil temperature servo represents the oil pressure in accordance with R. P. M. and oil temperature conditions. As shown, slider contact 129 connects with the servo amplifier 120 over line 129', contact 131b and line 148 provided relay 130 is de-energized and its back contact 131b is closed which is normally the case. The oil pressure servo is operated in accordance with the voltage +OP (RPM, OT) to control an indicator 132 for reflecting R. P. M. and oil temperature position. In low blower operation the voltage input —OP (HI. BLOWER) to the oil pressure servo is zero, the line 133 being grounded over relay contact 134b of the high blower thyratron 165 line 147 and a contact 146 of a blower shifting relay 136. When, however, there is a shift from low blower operation to high blower operation, the high blower thryratron fires causing relay 64 to pick up thereby opening contact 134b and closing contact 134a. Contact 135b of relay 64 also opens and contact 135a closes. As shown line 137 connects through the coil of relay 136 with direct voltage source E (D. C.). A momentary surge of current is therefore produced in line 137 through condenser 138 causing relay 136 to pick up whereupon contact 135b opens and contact 135a closes thus completing a circuit through contact 139b of relay 130, contact 146a of relay 136, contact 134a of relay 64, and line 133 to the oil pressure servo amplifier causing a dip in the indicator 132. The effect is only momentary as relay 136 drops out when the condenser 138 is fully charged whereupon relay contact 146a opens and 146b closes to connect line 133 to ground over contact 134a line 145 and contact 146b. The relay 130 is controlled by means of a fire wall shut-off switch 141. Normally this switch is open so that the energizing circuit for relay 130 extending from direct voltage source E (D. C.) through the relay coil, over line 140 and contact 144a is open at contact 144a. Relay 130 is therefore normally de-energized and its contacts 139b and 131b are closed. Fire wall shut-off switch, however, may be moved to a closed position in which event the relay 130 is energized over line 140 to open contacts 139b and 131b and close contacts 139a and 131a. This has the effect of grounding-out the +OP (RPM, OT) voltage and —OP (HI. BLOWER) voltage inputs to servo amplifier 120 so that the oil pressure servo and its indicator 129 run to a zero reading to reflect a complete removal of pressure in the oil pressure system. As stated, the fire wall shut-off switch 141 is normally in an open position so that relay 130 is de-energized. The switch is moved to a closed position only when an emergency condition exists making it necessary to cut-off oil pressure in the engine.

It should be understood that this invention is not limited to specific details of construction and arrangement thereof herein illustrated, and that changes and modifications may occur to one skilled in the art without departing from the spirit of the invention.

What is claimed is:

1. In aircraft training apparatus having computing means responsive to the operation of simulator controls by a student for simulating flight conditions and aircraft operation, means for simulating the operation of a manifold pressure system of the type having a two stage blower which automatically shifts from a first stage of low blower operation to a second stage of high blower operation to increase engine manifold pressure as required comprising a simulated throttle control, means operatively connected with said control for deriving a voltage representing manifold pressure requested according to the position of said control, means for deriving another voltage opposite in sign from said one voltage and representing a reduction in manifold pressure requested according to the altitude of simulator flight and simulated engine R. P. M., a servo mechanism having said one and another derived voltages as inputs thereto, indicating means operated by said servo mechanism for representing manifold pressure, means for deriving a voltage representing available manifold pressure in one or the other stages of operation of said blower including control means for regulating such derived voltage to represent available manifold pressure in low blower operation provided manifold pressure remains less than an amount which is slightly less than the manifold pressure which is available in low blower operation and to represent available manifold pressure in high blower if manifold pressure exceeds such amount, and means for disconnecting said one and another derived voltages as inputs to the servo mechanism and connecting thereto the voltage representing available manifold pressure when the sum of the said one and another voltages attains a value equal to the voltage representing manifold pressure available.

2. The aircraft training apparatus having computing means responsive to the operation of simulator controls by a student for simulating flight conditions and aircraft operation, means for simulating the operation of a manifold pressure system of the type having a two stage blower which automatically shifts from a first stage of low blower operation to a second stage of high blower operation to increase engine manifold pressure as required comprising a simulated throttle control, means operatively connected with said control for deriving a voltage representing manifold pressure requested according to the position of said control, means for deriving another voltage opposite in sign from said one voltage and representing a reduction in manifold pressure requested according to the altitude of simulator flight and simulated engine R. P. M., a servo mechanism having said one and another derived voltages as inputs thereto, indicating means operated by said servo mechanism for representing manifold pressure, means for deriving a voltage representing available manifold pressure in one or the other stages of operation of said blower including a thyratron for regulating such derived voltage to represent available manifold pressure in low or high blower according to whether the thyratron is unfired or fired respectively and means for controlling the thyratron to fire only when manifold pressure exceeds a value slightly less than the manifold pressure which is available in low blower operation, and means for disconnecting said one and another derived voltages as inputs to the servo mechanism and connecting thereto the voltage representing available manifold pressure when the sum of said one and another voltages attains a value equal to the voltage representing manifold pressure available.

3. In aircraft training apparatus having computing means responsive to the operation of simulator controls by a student for simulating flight conditions and aircraft operation, means for simulating the operation of a manifold pressure system of the type having a two stage blower which automatically shifts from a first stage of low blower operation to a second stage of high blower operation to increase engine manifold pressure as required comprising a simulated throttle control, means operatively connected with said control for deriving a voltage representing manifold pressure requested according to the position of said control, means for deriving another voltage opposite in sign from said one voltage and representing a reduction in manifold pressure requested according to the altitude of simulator flight and simulated engine R. P. M., a servo mechanism having said one and another derived voltages as inputs thereto, indicating means operated by said servo mechanism for representing manifold pressure, means for deriving a voltage representing available manifold pressure in one or the other stages of operation of said blower including a thyratron for regulating such derived voltage to represent available manifold pressure in low or high blower according to whether the thyratron is unfired or fired respectively, means operatively connected to said servo mechanism for deriving a voltage representing manifold pressure, and means for calculating a voltage representing manifold pressure available in low blower operation regardless of whether low blower or high blower operation prevails, the thyratron being operated according to the relative magnitudes of the voltage representing manifold pressure and the calculated voltage representing manifold pressure available in lower blower operation, and said thyratron being biased to fire only when the voltage representing manifold pressure exceeds a value slightly less than the said calculated voltage, and means for disconnecting said one and another derived voltages as inputs to the servo mechanism and connecting thereto the voltage representing available manifold pressure when the sum of said one and another voltage attains a value equal to the voltage representing manifold pressure available.

4. In aircraft training apparatus having computing means responsive to the operation of simulator controls by a student for simulating flight conditions and aircraft operation, means for simulating the operation of a manifold pressure system of the type having a two stage blower which automatically shifts from a first stage of low blower operation to a second stage of high blower operation to increase engine manifold pressure as required comprising a simulated throttle control, means operatively connected with said control for deriving a voltage representing manifold pressure requested according to the position of said control, means for deriving another voltage opposite in sign from said one voltage and representing a reduction in manifold pressure requested according to the altitude of simulator flight and simulated engine R. P. M., a servo mechanism having said one and another derived voltages as inputs thereto, indicating means operated by said servo mechanism for representing manifold pressure, means operatively connected to said servo mechanism for deriving a voltage representing manifold pressure, means for deriving a first and second set of voltages, said first set representing in summation available manifold pressure in low blower operation as a function of simulator altitude and simulated engine R. P. M., and the second set of voltages representing in summation with the first set available manifold pressure in high blower operation as a function of simulator altitude and simulated engine R. P. M., summing means having the first set of voltages connected thereto as inputs to provide a voltage output representing available manifold pressure in low blower operation, the second set of voltages also being connected to the summing means only in high blower operation to provide a voltage output representing available manifold pressure in high blower operation, a thyratron having the second set of voltages as inputs in high blower operation only and having the output voltage of the summing means being opposite in sign to the sum of said second set of voltages whereby the sum of such input voltages to the thyratron always represents the available manifold pressure in low blower operation, the thyratron also having said voltage representing manifold air pressure as an input and the thyratron being biased to fire so as to simulate a shift from low to high blower operation when the voltage representing engine manifold pressure exceeds a value slightly less than the summation of voltages representing manifold pressure available in low blower, and means controlled by said thyratron for connecting the said second set of voltages to the summing means and thyratron when the thyratron fires.

5. The combination as defined in claim 4 with the addition of means for deriving voltages representing the effect of air filter operation, carburetor icing conditions and the extent of carburetor preheating on available manifold pressure, such voltages being connected to the summing means to more accurately determine the output voltage thereof representing available manifold pressure in either low or high blower operation.

6. The combination as defined in claim 5 with the addition of an oil pressure servo for registering simulated oil pressure controlled according to simulated engine R. P. M., and oil temperature, an indicator operated by the oil pressure servo for representing oil pressure, and means responsive to the operation of said thyratron for supplying a temporary signal to said oil pressure servo when the thyratron fires to effect a dip in the oil pressure indicator.

7. In aircraft training apparatus having computing means responsive to the operation of simulator controls by a student for simulating flight conditions and aircraft operation, means for deriving voltages respectively representing outside air temperature during the course of simulator flight and the extent of carburetor heating, servo means having said voltages as inputs and operated thereby to reflect carburetor air temperature, circuitry including contacts controlled by said servo means and positioned according to carburetor air temperature as determined by the input voltages to the servo means, said circuitry also including a contact controlled by an instructor for simulating wet or dry weather, an icing motor having windings energized by said circuitry according to the operation of said contacts to reflect carburetor icing conditions, and means controlled by said motor for deriving a voltage representing the extent of ice formation.

8. In aircraft training apparatus having computing means responsive to the operation of simulator controls by a student for simulating flight conditions and aircraft operation, means for deriving voltages respectively representing outside air temperature during the course of simulator flight and the extent of carburetor heating, servo means having said voltages as inputs and operated thereby to reflect carburetor air temperature, circuitry including cam-operated contacts controlled by said servo means and positioned according to carburetor air temperature as determined by the input voltages to the servo means, said circuitry also including a contact controlled according to whether simulated engine R. P. M. is less or greater than a predetermined amount representing a limiting condition for operation of the aircraft engine, the said circuitry further including a contact controlled by an instructor for simulating wet or dry weather, an icing motor having windings energized by said circuitry according to the operation of said contacts to reflect carburetor icing conditions, and means controlled by said motor for deriving a voltage representing the extent of ice formation.

9. In aircraft training apparatus having computing means responsive to the operation of simulator controls by a student for simulating flight conditions and aircraft operation, and including means for simulating the operation of a two stage blower for supplying manifold air pressure, an oil pressure servo for registering simulated oil pressure controlled according to simulated engine R. P. M. and oil temperature, a D. C. voltage source, circuit means including a condenser and a relay, means operated to reflect a shift in blower operation for one stage to another for causing said circuit means to be energized by the D. C. voltage source thereby energizing the relay through the condenser momentarily until the condenser is fully charged whereupon the relay is deenergized, another voltage source, circuit means controlled by said relay to connect said another voltage source to the oil pressure servo while the relay is energized, the oil pressure servo thereby being operated to reflect a momentary oil pressure dip, and indicating means controlled by the oil pressure servo.

10. In aircraft training apparatus having computing means responsive to the operation of simulator controls by a student for simulating flight conditions and aircraft operation, means for simulating the operation of a manifold pressure system of the type having a two stage blower which automatically shifts from a first stage of low blower operation to a second stage of high blower operation to increase engine manifold pressure as required comprising a simulated throttle control, means operatively connected with said control for deriving a first control quantity representing manifold pressure requested, means for deriving a second control quantity representing the effect of altitude and engine R. P. M. on manifold pressure requested, means for computing manifold air pressure controlled at times according to said first and second control quantities, means for deriving a third control quantity representing manifold pressure available in one or the other stages of operation of said blower including control means for regulating such control quantity to represent manifold pressure available in low and high blower operation respectively according to the computed value of manifold air pressure as compared to the manifold pressure available in low blower, and means operated according to the first, second and third derived control quantities for controlling the manifold air pressure computing means according to the said third derived control quantity when the combined value of said first and second control quantities is greater than the third control quantity representing manifold pressure available.

11. In aircraft training apparatus having computing means responsive to the operation of simulator controls by a student for simulating flight conditions and aircraft operation, means for simulating the operation of a manifold pressure system of the type having a two stage blower which automatically shifts from a first stage of low blower operation to a second stage of high blower operation to increase engine manifold pressure as required comprising a simulated throttle control, means operatively connected with said control for deriving a first control signal representing manifold pressure requested, means for deriving a second control signal representing the effect of altitude and engine R. P. M. on manifold pressure requested, means for computing manifold air pressure controlled at times according to said first and second control signals, indicating means controlled by said computing means, means for deriving a third control signal representing manifold pressure available in one or the other stages of operation of said blower including control means for regulating such control signal to represent manifold pressure available in low and high blower operation respectively according to the computed value of manifold air pressure as compared to the manifold pressure available in low blower, and means operated according to the first, second and third derived control quantities for controlling the manifold air pressure computing means according to the said third derived control signal when the first and second control signals in summation are greater than the third control signal representing manifold pressure available.

References Cited in the file of this patent

UNITED STATES PATENTS

| | | |
|---|---|---|
| 2,496,617 | Burelbach | Feb. 7, 1950 |
| 2,499,597 | Lukacs | Mar. 7, 1950 |
| 2,506,949 | Burelbach et al. | May 9, 1950 |
| 2,510,500 | Hayes et al. | June 6, 1950 |